June 7, 1949.  E. H. ALDEBORGH ET AL  2,472,139
BORE GAUGE
Filed Nov. 3, 1944  4 Sheets-Sheet 1
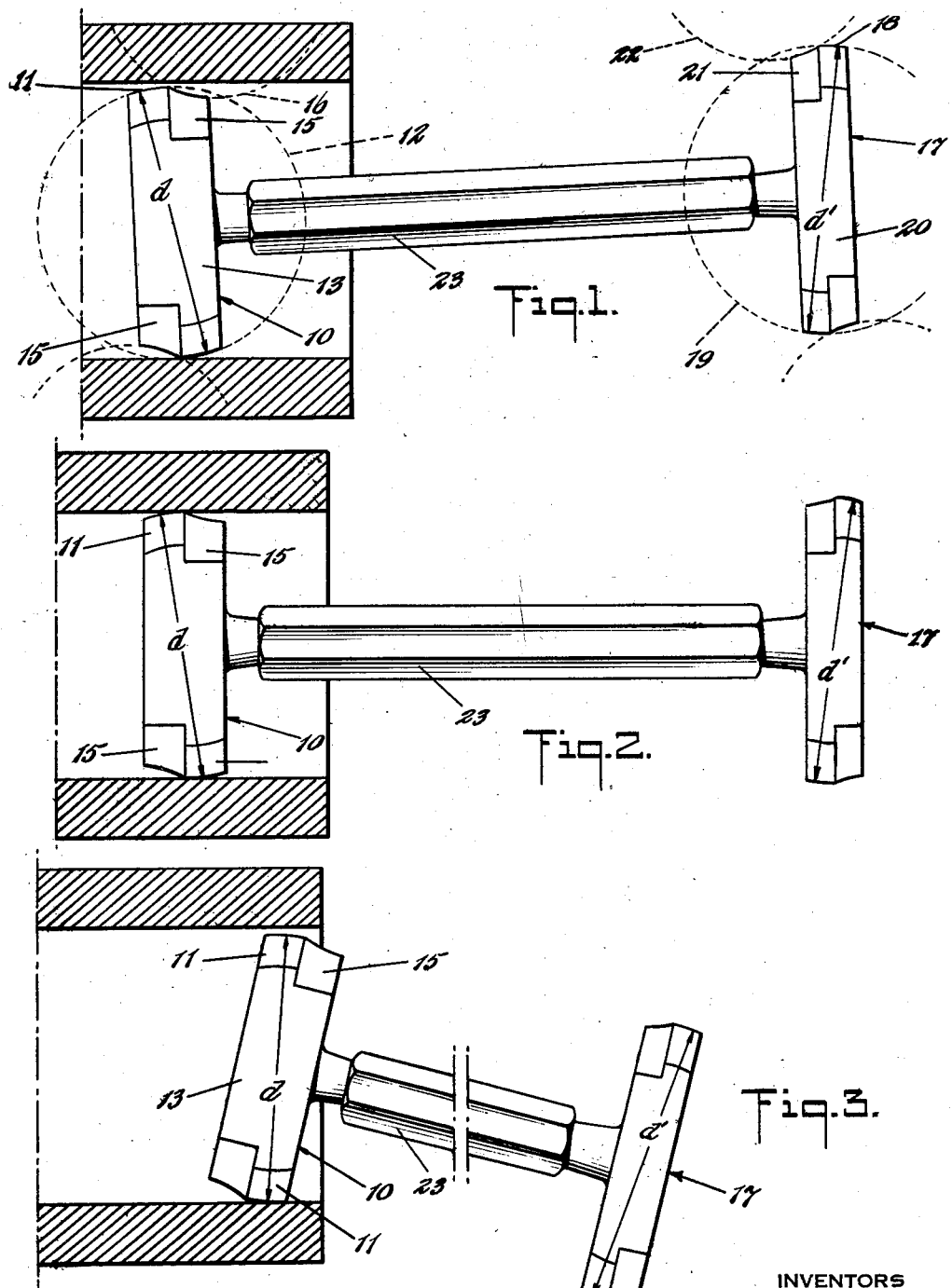
INVENTORS
ERIK H. ALDEBORGH
ALFRED H. EMERY
BY Darby & Darby
ATTORNEYS

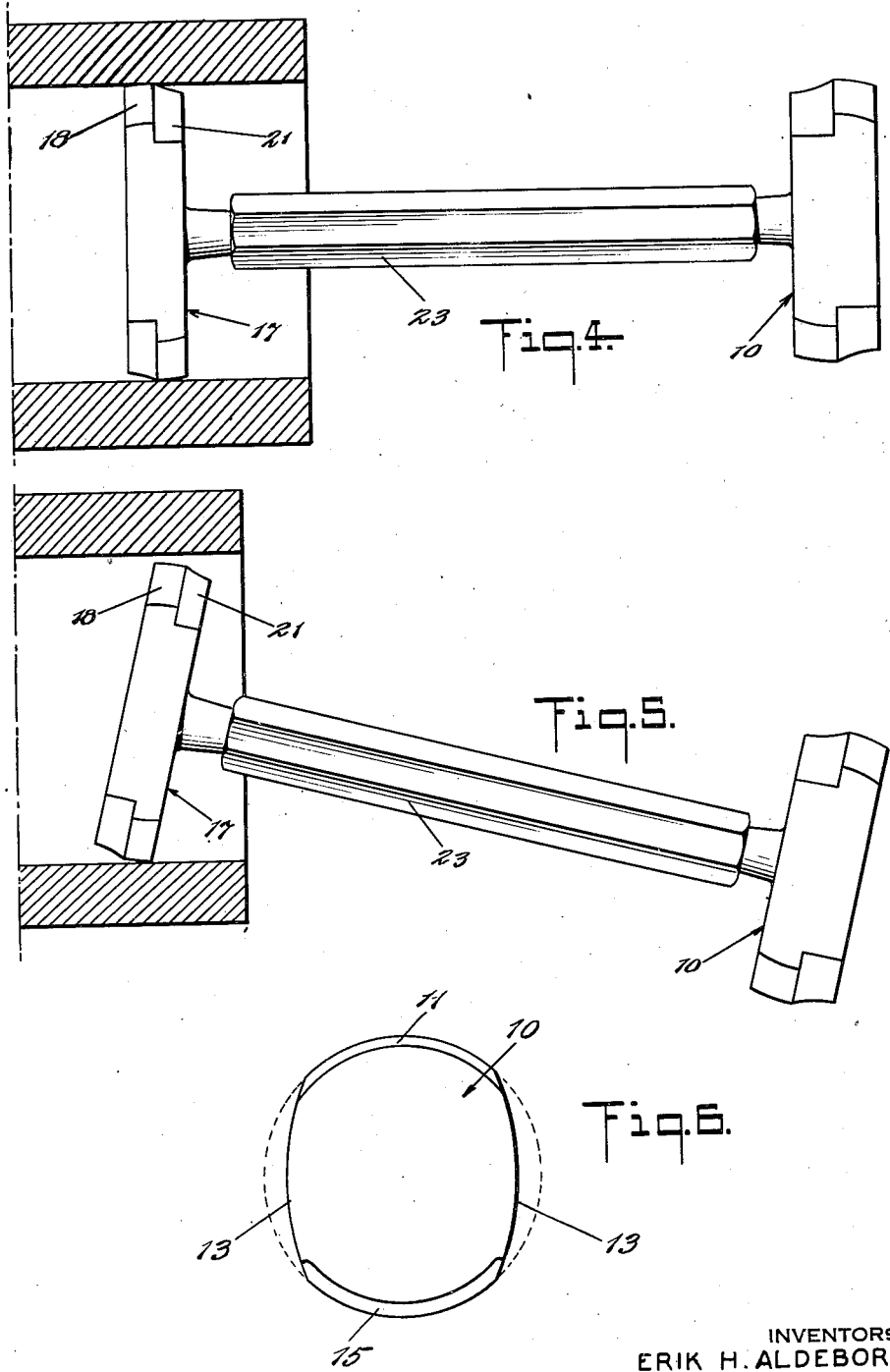

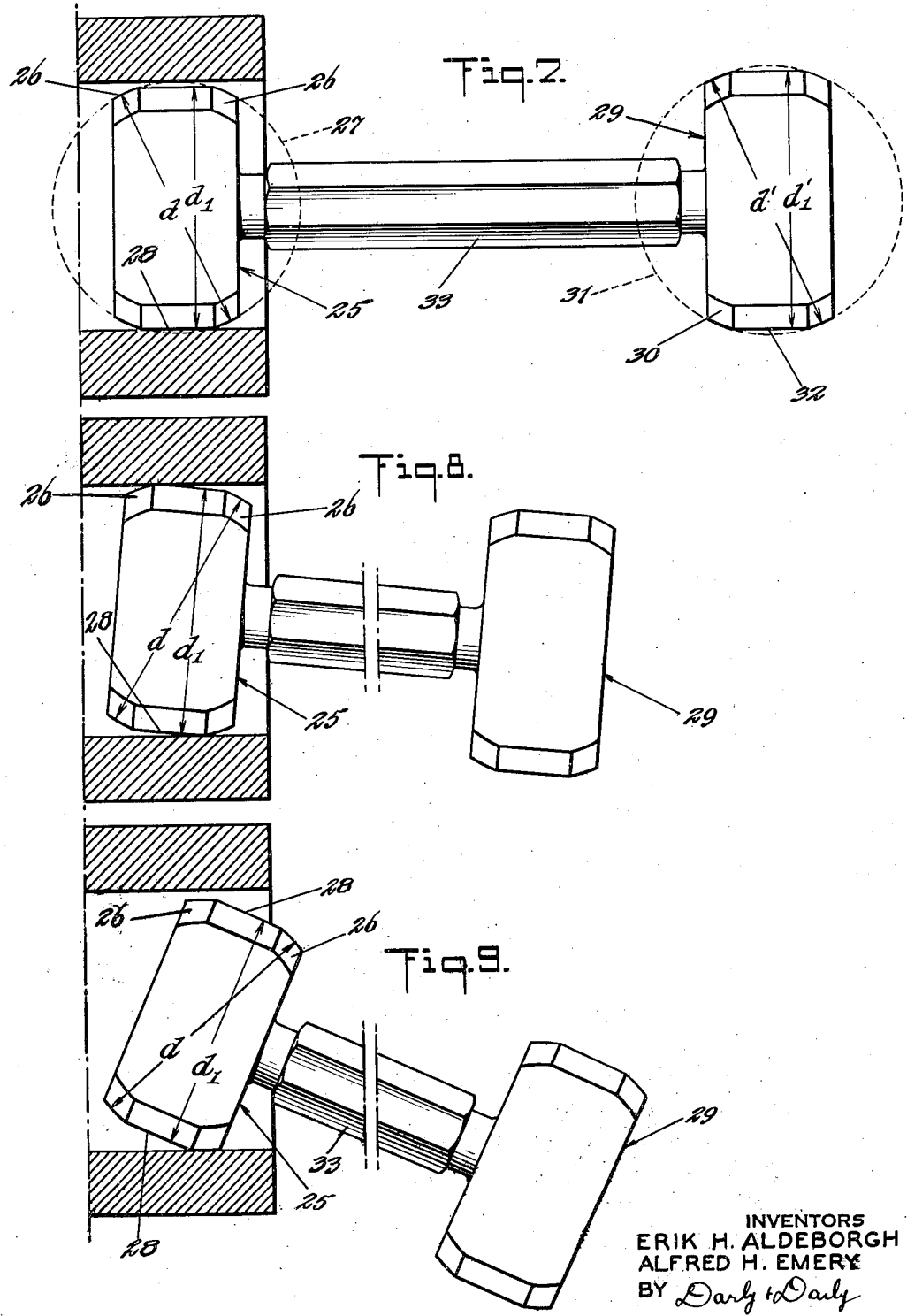

June 7, 1949.   E. H. ALDEBORGH ET AL   2,472,139
BORE GAUGE
Filed Nov. 3, 1944   4 Sheets-Sheet 4
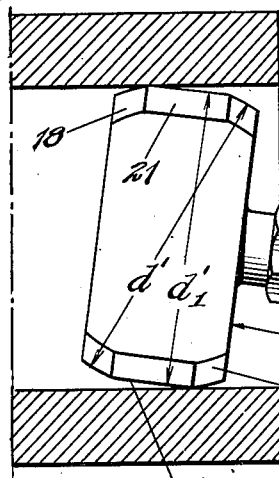
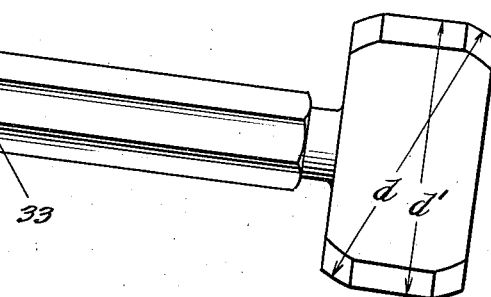
Fig. 10.
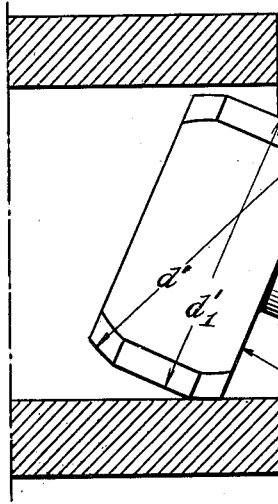
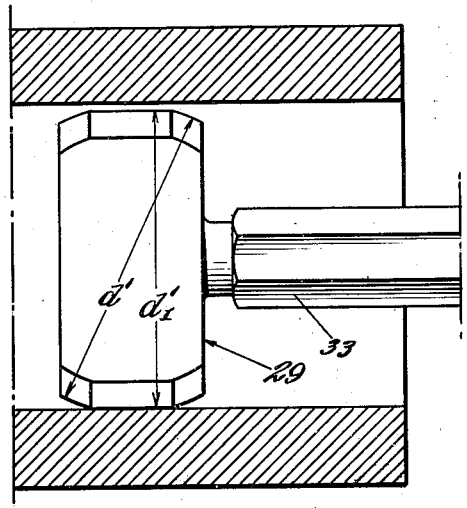
Fig. 11.
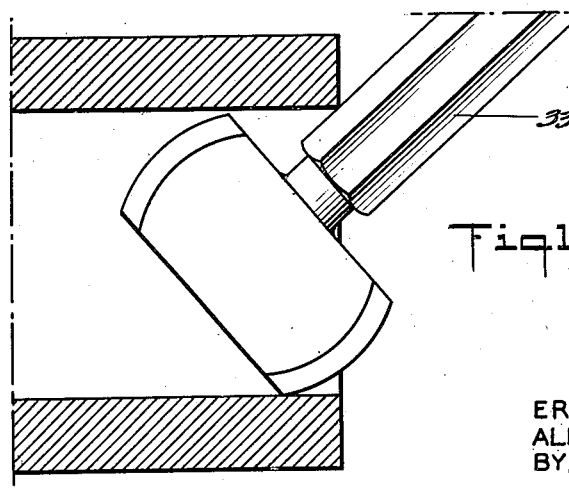
Fig. 13.
Fig. 12.
INVENTORS
ERIK H. ALDEBORGH
ALFRED H. EMERY
BY Darby + Darby
ATTORNEYS Patented June 7, 1949

2,472,139

UNITED STATES PATENT OFFICE 2,472,139

BORE GAUGE

Erik H. Aldeborgh, Poughkeepsie, and Alfred H. Emery, Wappingers Falls, N. Y., assignors to Standard Gage Company, Inc., Poughkeepsie, N. Y., a corporation of New York Application November 3, 1944, Serial No. 561,651

11 Claims. (Cl. 33—178)

1

The present invention relates to bore gages and particularly to such a gage for determining when a bore is within set tolerance limits.

In the past the most commonly used tolerance gage for measuring bore diameters was that known as the plug gage which consisted of two cylinders, one mounted on either end of a handle, one being finished to the minimum tolerance and the other to the maximum. Such a gage has a number of disadvantages amongst which may be mentioned its inability to determine any existing out-of-round condition and the fact that it checks only the magnitude of the inscribed circle of the bore.

Another type of gage which has recently been used for the purpose of checking hole or bore diameters is that shown in Tornebohm United States Patent No. 1,793,763 of February 24, 1931. The device of this patent comprises an equatorial zone of a sphere which constitutes the minimum gaging member together with a spherically finished button mounted on the minimum gaging member near the equator thereof which constitutes the maximum gaging member. In utilizing this gage it is necessary to insert the gage in a tipped position into the bore in order that only the minimum gaging surface will make contact with the bore. Consequently, it is impossible to insert such a gage into a deep bore because the handle of the gage will make contact with the edge of the bore before the gage has been inserted far enough to determine the conditions near the bottom of the bore.

A gage has been suggested, comprising a single gaging member having a spherical maximum gaging surface and a cylindrical coaxial minimum gaging surface. Such a gage cannot be made for use when the tolerance range is extremely small since in this case the cylindrical surface becomes so limited in extent as to substantially disappear or at best become a line so subject to wear that the gage is without practical utility.

Our present invention overcomes the fault mentioned above. It comprises a gage having two gaging members thereon preferably at either end of a common handle, each of these members having a gaging surface which is a substantial portion of the equatorial zone of a sphere, one member being used for determining the maximum tolerance limit and the other the minimum tolerance limit. Each gaging member likewise has a relieved portion which, however, is solely for the purpose of providing clearance so that the spherical body may be entered into the bore to be checked. This arrangement not only permits the checking of bores to very fine limits but has the additional advantage that taper and out-of-roundness may be discovered even when such taper and out-of-round conditions make the entrance to the bore of a lesser diameter than the minimum gaging diameter of the gage.

In the preferred form of our invention the relieving of the spherical surface extends from the equator of the sphere clockwise in the direction of measuring rotation to the edge of the equatorial zone. The relieved surface joins the equatorial zone and forms a sharp edge which edge gives very good wiping action and removes any foreign matter which may be present in the bore.

In another and less preferred form of our invention the relieving of the spherical surface is provided by a cylindrical surface extending on both sides of the equator, the radius of this cylindrical surface being considerably less than the spherical radius since the cylindrical surface is not a measuring surface but is provided solely for clearance.

It is an object of this invention to provide a bore gage having a maximum gaging member which consists of a substantial portion of an equatorial zone of a sphere and a minimum gaging member which consists of a substantial portion of an equatorial zone of a sphere of lesser diameter, both said gaging members being relieved along the equator to permit entry of the sphere into a bore, with the handle in a substantially horizontal position.

It is another object of the invention to produce such a gage having a relatively great amount of contact between the gaging surfaces and the bore measured. This is particularly in contrast to gages of the Tornebohm type in which the area of contact for the maximum measurement is solely that of a small measuring button.

It is a still further object of the invention to provide a gage capable of checking very near the bottom of a blind bore.

It is a still further object of the invention to provide a gage in which the presence of small amounts of foreign material in the bore will not affect the accuracy of measurement of the gage, since the sharp edge between the relieved and spherical measuring surface produces a wiping action during measurement.

It is a still further object of the invention to provide a gage by means of which out-of-round or barrel shaped bores may be checked and the conditions mentioned detected.

It is a still further object of the invention to provide a gage by means of which out-of-round and taper conditions can be detected even though the taper or the out-of-round condition may be so great that the entrance to the bore is of lesser diameter than the minimum set tolerance.

Other objects and features of the invention will appear when the following description is considered in connection with the annexed drawings in which—

Figure 1 is a side elevation of the preferred form of our invention showing the minimum gaging member thereof inserted in a bore for checking;

Figure 2 is a view similar to Figure 1 but showing the continuance of the checking operation on the piece;

Figure 3 is a view similar to Figure 2 showing the condition when the diameter of the bore being checked is greater than minimum;

Figure 4 is an elevation similar to Figure 1 but showing the gage reversed with the "not go" member inserted in the bore being checked. This figure illustrates the condition when the bore is within the tolerance limits, that is, the diameter of the bore is less than the maximum set diameter;

Figure 5 is a view similar to Figure 4 but illustrating the condition when the bore being checked is of a greater diameter than the maximum permissible;

Figure 6 is an end elevation of the gage of Figures 1 through 5 showing the manner in which the sides of the spherical zone have been ground away in order to reduce the area of contact of the gage surface with the bore and to make it possible to more readily gage any bore and particularly a bore which is out-of-round or tapered;

Figure 7 is a side elevation of the form of my invention in which clearance is provided by means of a cylindrical surface extending on both sides of the equator of the spherical equatorial zone. This view shows the minimum gaging member inserted in a bore for checking;

Figure 8 is a view similar to Figure 7 but showing the continuance of the checking operation on the piece;

Figure 9 is a view similar to Figure 8 showing the condition when the diameter of the bore being checked is greater than minimum;

Figure 10 is a view similar to Figure 7 showing the maximum gaging member inserted in a bore which bore is of a diameter within the tolerance limits;

Figure 11 is a view similar to Figure 10 showing the condition when the diameter of the bore being checked exceeds the maximum tolerance;

Figure 12 is a view of a theoretically possible gage having a spherical gaging member and no relieved surface thereon illustrating that such a gage must be tipped in order to enter a bore; and Figure 13 is a view similar to Figure 7 illustrating particularly that the handle of the gage is parallel to the bore being checked.

Referring now to Figure 1, there is shown at 10 a gaging body for the minimum or "go" diameter which comprises an equatorial zone 11 of a sphere such as that indicated in dash lines at 12. The body 10 has portions removed from the sides thereof as indicated at 13 (Figures 1 and 5) for a purpose hereinafter described. In addition and more importantly, the body 10 is relieved adjacent the equator of the remaining portion of the equatorial zone 11, that is the relieved portion is substantially co-extensive with the great circle arcs remaining after removal of the portions indicated at 13. This latter relief is indicated at 15, the relieved surface extending from the equator of the zone to the edge removed therefrom in the direction of measuring movement of the gage. As seen in the drawing, the relieved portion extends from the equator clockwise to the edge of the body 10. This relief is preferably concave in formation as is indicated by the dashed arc 16, thus providing a sharp measuring edge.

It will thus be clear that the spherical diameter $d$ is the measuring diameter of the minimum element of the gage.

The maximum gaging member 17 is substantially identical with the member 10 although for the purposes of distinguishing between the two the width of the equatorial zone is somewhat less than that of the member 10. The gaging member 17 is an equatorial zone 18 of a sphere indicated by the dashed lines 19, the diameter $d'$ of this zone being the maximum set diameter. The body 17 is provided with side reliefs 20 similar to those 13 of the member 10 and is likewise provided with the clearance reliefs 21 similar to the reliefs 15 of the member 10. The clearance reliefs are here again co-extensive with the great circle arcs of the portions of the equatorial zone remaining after side reliefs have been provided. Moreover, the clearance reliefs are preferably concave in form as indicated by the dashed line 22. The concave form of the reliefs 15 and 21 provides a sharp edge between the spherical zone and the relief surfaces which sharp edge aids materially in moving any foreign matter which may be present in the bore. The juncture between the spherical surface and the reliefs has been described as being on the equator. However, if desirable, these reliefs may extend somewhat beyond the equator thereby making it possible to insert the gage without tipping it. The two body members 10 and 17 are mounted on a common handle 23 so that the "go" and "not go" members will be kept together and cannot be erroneously used. Of course, this use of a common handle although preferable is not necessary.

Either the maximum or minimum gage 17 and 10, respectively, may be constructed with only one clearance relief 21 or 15 instead of two, one at either end of a diameter, without affecting materially the operation of the gage.

Referring now particularly to Figure 1, there is illustrated therein the checking of a bore by the minimum gage 10. In this instance the gage has been inserted at a slight angle to the axis of the bore and such insertion is the first step in gaging the minimum diameter but of itself gives no indication of size.

In Figure 2 the gage has been rotated about the center of the body portion 10 until contact is made with the walls of the bore being checked. The fact that such contact is made and that the spherical portion will not rotate indicates that the bore of the particular piece is less than the minimum diameter.

Figure 3 illustrates the insertion of the member 10 into a bore of diameter greater than the minimum and the fact that the gage may be tipped about the center of the body portion 10 without making contact with the bore walls thereby shows that the bore checked is greater than the minimum set diameter.

Referring now to Figure 4, there is shown therein the insertion of the maximum gaging member 17 into a bore which bore has a diameter less than the maximum set. The fact that the diameter is proper is, of course, indicated by the positioning of the gage which is permitted to rotate only until the lines of juncture between the spherical portion 18 and the relieved clearance 21 bear against the walls of the bore.

In Figure 5 there is shown the condition which exists when the gage is utilized to check a bore, the diameter of which is greater than the maximum set dimension. The free tipping of the gage as illustrated in this figure indicates that the condition is the one mentioned, namely, that the bore has a diameter greater than is permissible.

It will be seen that with the gage heretofore described out-of-roundness and taper may readily be checked since the gage may be tipped and inserted in a bore, as indicated in Figure 1, even when the bore has a dimension less than the minimum permissible and that, consequently, when the gage, upon rotation, strikes against the bore walls, as shown in Figure 2, it will indicate that the bore at the particular place checked is of less than the minimum permissible diameter. The relief of the sides of the body members 10 and 17, as illustrated particularly in Figure 5, makes it possible to insert the gage in an out-of-round hole along the major axis thereof and to test the bore on the major diameter to indicate whether or not it is of the minimum diameter on this axis of the ellipse. In addition, it may, of course, be rotated through 90° and a check of the bore made by such rotation. That is, if it is impossible to so rotate the gage, it indicates that the bore is less than the minimum diameter on the minor elliptical axis and, of course, if the gage can be rotated but cannot then be tipped to the position shown in Figure 3 but can only be tipped to that position illustrated in Figure 2, the indication is likewise that the minor elliptical axis is beneath the minimum set bore diameter.

In another form of our invention illustrated in Figures 7 through 11 the minimum gaging body 25 again comprises the equatorial zone 26 of the sphere illustrated by the dashed line 27. The diameter $d$ of this member 25 is the minimum tolerance diameter. The member 25 is provided at 28 with a cylindrical surface which extends in both directions from the equator, the diameter $d_1$ of this cylindrical surface being substantially less than the diameter $d$ and forming a clearance or relief. The gage of Figure 7 likewise includes a maximum gaging or "not go" member 29 which is formed of the equatorial zone 30 of a sphere 31 of a diameter $d'$ which is the maximum bore diameter. Member 29 is also provided with a cylindrical surface 32 extending on both sides of the equator of the body 29, this cylinder having a diameter $d_1'$ which is substantially less than the diameter $d'$ and provides a clearance or relief similar to that provided in the form illustrated in Figures 1 through 6 by the reliefs 15 and 18.

As in the first form of the invention, one of the two members 25 and 29 is fixed to either end of a common handle 33 although this is, of course, a matter of convenience and each member might be provided with its separate handle.

As shown in Figure 7, the minimum gaging member 25 is inserted in a bore as a preliminary step to checking the diameter thereof.

In Figure 8 the gage has been tipped until the lines of juncture between the spherical portions 26 and the cylindrical portions 28 of the gage bear against the walls of the bore, thus showing that the bore diameter is less than the set minimum.

In Figure 9 there is illustrated the condition when the minimum gaging member 25 has been inserted into a bore the diameter of which is greater than the minimum. As illustrated the gage may in this case be tipped beyond the center line and, in fact, is free in the hole and would, if permitted so to do, tip until the handle 33 came into contact with the edge of the bore.

A bore having been checked as illustrated in Figure 9 and it having been found that the bore is of a greater diameter than the minimum, the next step is to reverse the gage and insert the maximum gaging or "not go" member 29 into the bore of the piece. This operation is illustrated in Figure 10. In this case the fact that the junction between the spherical portions 18 and the relief portions 21 bears against the walls of the bore indicates that the bore is of lesser diameter than the set maximum.

Had the bore been of a greater diameter than the maximum, the condition illustrated in Figure 11 would exist and the piece would have been above the tolerance limits and, therefore, rejected.

It will be seen that the preferred form of our invention, due to the sharp edge between the spherical surface and the relieving surface, produces a better wiping action than does the form shown in Figures 7 through 11 and thereby removes foreign matter from the bore at the place of measurement. Either form is preferable in this respect to gages such as that of the Tornebohm patent in which there is a tendency to wedge any foreign matter between the spherical surface and the bore wall.

At times, the gage of Figures 7 through 11 is in some respects preferable to that of Figures 1 through 6. If a very deep bore is being checked the gage of Figures 1 through 6 may need to be inserted at such an inclination that the handle 23 will strike the edge of the bore. This condition would also be true and to an even greater extent if the completely spherical gage illustrated in Figure 12 were to be utilized. By comparing Figure 13 with Figure 12 it will be seen that the cylindrical surface such as 28 permits entry of the gage into the bore with the axis of the handle parallel to that of the bore and obviates any difficulty which would result from the insertion at an angle. However, the first form of our invention is the preferred one since the gage shown in Figures 7 through 11 is subject to sticking in the bore and cannot be released by rotation in the direction opposite to the checking direction since such rotation must be abrupt in order to release the gage and thus causes the gage to stick even more tightly on the other pair of juncture lines between the spherical surface, such as 26, and the cylindrical surface, such as 28.

Due to the narrow equatorial zone which may be used in both forms of our invention, blind bores may be readily checked to very nearly the bottom thereof since the juncture lines on which the measurement is taken need not be spaced from the bottom of the bore more than approximately three-quarters of the width of the equatorial zone or body member, such as 10, of the gage.

Furthermore, the gage of either form may be readily used for checking deep bores since with either form the gage may be inserted with the handle parallel to, or very nearly parallel to, the axis of the bore. As has been pointed out, the gage of Figures 7 through 11 is preferable in this respect but, nevertheless, either gage may be used to check bores much deeper than can be checked, for example, with the gage shown in the Tornebohm patent above mentioned.

Moreover, both forms of our invention are of great advantage in measuring the dimensions of bores which are out-of-round or which taper toward the end in which the gage is to be entered, due to the fact that the minimum gaging member is provided with clearance reliefs, either arcuate or cylindrical, which permit entry thereof into a bore smaller at the entering end than the minimum set diameter. This is, of course, of great advantage where a piece is to be checked on a machine and the gage cannot be entered from the larger end of the tapered bore.

While we have described preferred embodiments of our invention, it is to be understood that this description is not to limit the scope of the invention. On the contrary, the description is for purposes of illustration only and no limitation is to be implied other than that of the appended claims.

What is claimed is:

1. In a bore gage, a body comprising a substantial portion of the equatorial zone of a sphere, said body being subdivided into two diametrically opposed parts, corresponding great circle arcs of said two opposed parts constituting the gaging element, and a relieved surface adjacent to and substantially co-extensive with the said great circle arc of each of said opposed equatorial zone parts, said relieved surface providing clearance to permit ready entry of the body into a bore to be gaged.

2. In a bore gage, a body comprising a substantial portion of the equatorial zone of a sphere, said body being subdivided into two equal, diametrically opposed parts, corresponding great circle arcs of said two opposed parts constituting the gaging element, and a relieved surface adjacent to and substantially co-extensive with the said great circle arc of each of said opposed equatorial zone parts, said relieved surface providing clearance to permit ready entry of the body into a bore to be gaged.

3. In a bore gage, a body comprising a substantial portion of the equatorial zone of a sphere, said body being subdivided into two diametrically opposed parts, corresponding great circle arcs of said two opposed parts constituting the gaging element, and a relieved non-gaging surface adjacent to and substantially co-extensive with the said great circle arc of each of said opposed equatorial zone parts, said relieved surface providing clearance to permit ready entry of the body into a bore to be gaged.

4. In a bore gage, a body comprising a substantial portion of the equatorial zone of a sphere, said body being subdivided into two diametrically opposed parts, corresponding great circle arcs of said two opposed parts constituting the gaging element, and a relieved surface having a non-spherical contour adjacent to and substantially co-extensive with the said great circle arc of each of said opposed equatorial zone parts, said relieved surface providing clearance to permit ready entry of the body into a bore to be gaged.

5. In a bore gage, a body comprising a substantial portion of the equatorial zone of a sphere, said body being subdivided into two equal, diametrically opposed parts, corresponding great circle arcs of said two opposed parts constituting the gaging element, and a relieved surface having a non-spherical contour adjacent to and substantially co-extensive with the said great circle arc of each of said opposed equatorial zone parts, said relieved surface providing clearance to permit ready entry of the body into a bore to be gaged.

6. In a bore gage, a body comprising a substantial portion of the equatorial zone of a sphere, said portion being subdivided and each part lying at one end of a diameter of a great circle of the sphere, the great circle arcs thus formed constituting a gaging element, and a clearance surface having a non-spherical contour adjacent each of said great circle arcs and co-extensive therewith, said clearance surfaces providing means whereby the gage may be readily entered into a bore, the diametrical distance between the juncture of one of said spherical parts and its associated clearance surface and the other of said subdivided spherical parts and its clearance surface constituting the gage diameter.

7. In a bore gage, a body comprising a substantial portion of the equatorial zone of a sphere, said body being subdivided into two diametrically opposed parts, corresponding great circle arcs of said two opposed parts constituting the gaging element, and a relieved surface having a concave contour adjacent to and substantially co-extensive with the said great circle arc of each of said opposed equatorial zone parts, said relieved surface providing clearance to permit ready entry of the body into a bore to be gaged.

8. In a bore gage, a body comprising a substantial portion of the equatorial zone of a sphere, said body being subdivided into two diametrically opposed parts, corresponding great circle arcs of said two opposed parts constituting the gaging element, and a relieved surface adjacent to and substantially co-extensive with the said great circle arc of each of said opposed equatorial zone parts, said relieved surface extending from said great circle arcs to the edge of said body in the direction of measuring movement and providing clearance to permit ready entry of the body into a bore to be gaged.

9. In a bore gage, a body comprising a substantial portion of the equatorial zone of a sphere, said body being subdivided into two diametrically opposed parts, corresponding great circle arcs of said two opposed parts constituting the gaging element, and a relieved surface of concave contour adjacent to and substantially co-extensive with the said great circle arc of each of said opposed equatorial zone parts, said relieved surface extending from said great circle arcs to the edge of said body in the direction of measuring movement thereby providing clearance to permit ready entry of the body into a bore to be gaged and the sharp edge at the line of juncture between said spherical and concave surfaces forming a sharp edge to remove foreign matter from the bore at the measured point.

10. In a bore gage, a body comprising a substantial portion of the equatorial zone of a sphere and a cylindrical surface adjacent the equator of said spherical equatorial zone, said cylindrical surface forming a clearance and the line of juncture of said surface with said spherical surface constituting a great circular gaging element, said cylindrical clearance surface providing for ready entry of the body portion into a bore to be measured.

11. In a bore gage, a body comprising a substantial portion of the equatorial zone of a sphere, said body being subdivided into two diametrically opposed parts, a cylindrical surface formed adjacent the equator of said two opposed parts, said cylindrical surfaces forming clearances and a great circular line of juncture of said surfaces with said spherical surfaces constituting the gaging element.

ERIK H. ALDEBORGH.
ALFRED H. EMERY.

REFERENCES CITED

The following references are of record in the file of this patent:

FOREIGN PATENTS

| Number | Country | Date |
|---|---|---|
| 74,415 | Sweden | Mar. 20, 1930 |
| 291,286 | Great Britain | May 31, 1928 |
| 633,638 | Germany | July 31, 1936 |